(12) United States Patent
Wang

(10) Patent No.: US 11,113,379 B2
(45) Date of Patent: Sep. 7, 2021

(54) UNLOCKING METHOD AND VIRTUAL REALITY DEVICE

(71) Applicant: GOERTEK TECHNOLOGY CO., LTD., Qingdao (CN)

(72) Inventor: Peng Wang, Qingdao (CN)

(73) Assignee: GOERTEK TECHNOLOGY CO., LTD., Qingdao (CN)

(*) Notice: Subject to any disclaimer, the term of this patent is extended or adjusted under 35 U.S.C. 154(b) by 218 days.

(21) Appl. No.: 16/096,654

(22) PCT Filed: Nov. 30, 2017

(86) PCT No.: PCT/CN2017/113970
§ 371 (c)(1),
(2) Date: Oct. 25, 2018

(87) PCT Pub. No.: WO2019/061799
PCT Pub. Date: Apr. 4, 2019

(65) Prior Publication Data
US 2020/0193007 A1    Jun. 18, 2020

(30) Foreign Application Priority Data
Sep. 27, 2017  (CN) .......................... 201710892367.2

(51) Int. Cl.
*G06F 21/00*  (2013.01)
*G06F 21/36*  (2013.01)
(Continued)

(52) U.S. Cl.
CPC .......... *G06F 21/36* (2013.01); *G06F 3/04815* (2013.01); *G06F 3/04817* (2013.01); *G06F 21/46* (2013.01); *G06T 11/00* (2013.01)

(58) Field of Classification Search
CPC .. G06F 21/36; G06F 3/04815; G06F 3/04817; G06F 21/46; G06F 3/01; G06F 3/0481; G06T 11/00
See application file for complete search history.

(56) References Cited

U.S. PATENT DOCUMENTS 7,490,045 B1    2/2009  Flores et al.
7,657,849 B2 *  2/2010  Chaudhri ................ H04M 1/67
                                                  715/863
(Continued)

FOREIGN PATENT DOCUMENTS

CA    2 821 794 A1    6/2012
CN    102075619 A     5/2011
(Continued)

OTHER PUBLICATIONS

Machine Translation of CN106980779 (cited on Jan. 22, 20 IDS), European Patent Office (Year: 2017).*
(Continued)

*Primary Examiner* — Brandon S Hoffman
*Assistant Examiner* — William A Corum, Jr.
(74) *Attorney, Agent, or Firm* — Maschoff Brennan

(57) ABSTRACT

Provided are an unlocking method and a virtual reality device, including displaying A candidate icons, the A candidate icons including M password icons related to latest operations; in response to an operation of selecting an unlocking icon from the A candidate icons, acquiring the selected unlocking icon; and performing an unlocking operation according to the selected unlocking icon and the M password icons related to the latest operations. According to the unlocking method and apparatus provided by the embodiments of the present invention, by setting password icons related to latest operations, passwords can be updated in real time, so that the passwords are not easy to crack, and (Continued)

it is unnecessary to repeatedly and manually set the passwords.

19 Claims, 3 Drawing Sheets

(51) Int. Cl.
*G06F 3/0481* (2013.01)
*G06F 21/46* (2013.01)
*G06T 11/00* (2006.01)

(56) References Cited

U.S. PATENT DOCUMENTS

| | | | |
|---|---|---|---|
| 9,256,749 | B2 | 2/2016 | Choi et al. |
| 10,248,784 | B2* | 4/2019 | Maresh ................. H04L 63/102 |
| 2010/0079380 | A1 | 4/2010 | Nurmi |
| 2010/0269040 | A1 | 10/2010 | Lee |
| 2013/0097697 | A1* | 4/2013 | Zhu ....................... H04L 63/083 |
| | | | 726/18 |
| 2013/0283212 | A1 | 10/2013 | Zhu et al. |
| 2014/0184471 | A1* | 7/2014 | Martynov ............. G06F 3/0481 |
| | | | 345/1.2 |
| 2014/0317723 | A1 | 10/2014 | Hicks et al. |
| 2014/0365904 | A1 | 12/2014 | Kim et al. |
| 2015/0033361 | A1 | 1/2015 | Choi et al. |
| 2016/0140773 | A1 | 5/2016 | Yajima |
| 2017/0160812 | A1 | 6/2017 | Park et al. |
| 2017/0318019 | A1* | 11/2017 | Gordon ................... G06F 3/013 |
| 2019/0347399 | A1* | 11/2019 | Cramer ................... G06F 21/36 |

FOREIGN PATENT DOCUMENTS

| | | |
|---|---|---|
| CN | 102938814 A | 2/2013 |
| CN | 104166816 A | 11/2014 |
| CN | 104573441 A | 4/2015 |
| CN | 106295305 A | 1/2017 |
| CN | 106980779 A | 7/2017 |
| EP | 2 060 970 A1 | 5/2009 |
| EP | 2 637 471 A1 | 6/2012 |
| JP | 2016-95779 A | 5/2016 |
| KR | 10-2015-0013968 A | 2/2015 |
| KR | 10-2015-0015138 A | 2/2015 |
| WO | 2012/079530 A1 | 6/2012 |

OTHER PUBLICATIONS

CN Office Action dated Mar. 19, 2019 as received in Application No. 201710892367.2.
CN Office Action dated Aug. 22, 2019 as received in Application No. 201710892367.2.
CN Office Action dated Jan. 16, 2020 as received in Application No. 201710892367.2.
JP Notification of Reason for Refusal dated Jan. 7, 2020 as received in Application No. 2018-555913.
KR Notification of Reason for Refusal dated Jan. 10, 2020 as received in Application No. 10-2018-7031158.
EP Search Report in application No. 11 84 7985 dated Oct. 4, 2013.
European Search Report in Application No. 17905915.9 dated Aug. 4, 2020.

* cited by examiner

UNLOCKING METHOD AND VIRTUAL REALITY DEVICE

CROSS-REFERENCE TO RELATED APPLICATIONS

This application is a national stage of International Application No. PCT/CN2017/113970, filed on Nov. 30, 2017, which claims priority to Chinese Patent Application No. 201710892367.2, filed on Sep. 27, 2017. Both of the aforementioned applications are hereby incorporated by reference in their entireties.

TECHNICAL FIELD

The present invention relates to the technical field of virtual reality, and more particularly relates to an unlocking method and a virtual reality device.

BACKGROUND

A virtual reality (VR) technology is a computer simulation system capable of creating and experiencing a virtual world. It uses a computer to generate a simulation environment. It is a system simulation of a multi-source information fusion interactive three-dimensional dynamic vision and entity behavior, to immerse users in the environment.

In recent years, the virtual reality technology has developed rapidly, the scope of application has been greatly developed, and accordingly, lock screen applications related to virtual reality devices are gradually developing.

SUMMARY

The present invention provides an unlocking method, including:

displaying A candidate icons, the A candidate icons including M password icons related to latest operations;

acquiring, in response to an operation of selecting an unlocking icon from the A candidate icons, the selected unlocking icon; and performing an unlocking operation according to the selected unlocking icon and the M password icons related to the latest operations.

Optionally, the performing the unlocking operation according to the selected unlocking icon and the M password icons related to the latest operations includes:

judging whether the selected unlocking icon includes at least one of the M password icons related to the latest operations and a predetermined number of fixed icon; and if a judgment result is yes, performing the unlocking operation.

Optionally, the judging whether the selected unlocking icon includes at least one of the M password icons related to the latest operations and the predetermined number of fixed icon includes:

acquiring a password icon related to the last operation from the M password icons related to the latest operations; and judging whether the selected unlocking icon includes the password icon related to the last operation and a predetermined number of fixed icon.

Optionally, before the performing the unlocking operation, the method further includes:

judging whether an order of selecting the unlocking icon matches an order of the latest operations, and if so, performing the unlocking operation.

Optionally, before the displaying A candidate icons, the method further includes:

displaying at least one unlocking mode, the at least one unlocking mode including a combination unlocking mode of the password icon and the fixed icon;

acquiring, in response to the operation of selecting the unlocking mode from the at least one unlocking mode, the selected first unlocking mode;

if the first unlocking mode is the combination unlocking mode of the password icon and the fixed icon, generating the M password icons related to the latest operations, a predetermined number of fixed icon and other icons; and randomly arranging the M password icons related to the latest operations, a predetermined number of fixed icon and other icons, to form the A candidate icons; and Optionally, the performing the unlocking operation according to the selected unlocking icon and the M password icons related to the latest operations includes:

judging whether the selected unlocking icon is the same as the M password icons related to the latest operations; and if a judgment result is yes, performing the unlocking operation.

Optionally, before the displaying A candidate icons, the method further includes:

displaying at least one unlocking mode, the at least one unlocking mode including a password icon unlocking mode;

acquiring, in response to the operation of selecting the unlocking mode from the at least one unlocking mode, the selected second unlocking mode;

if the second unlocking mode is the password icon unlocking mode, generating the M password icons related to the latest operations and other icons; and randomly arranging the M password icons related to the latest operations and other icons, to form A candidate icons.

Optionally, the acquiring, in response to the operation of selecting the unlocking icon from the A candidate icons, the selected unlocking icon includes:

monitoring, for any one candidate icon in the A candidate icons, retention time of a cursor on the candidate icon; and if the retention time is greater than a preset time threshold, determining the candidate icon as the selected unlocking icon.

Optionally, a method of generating the M password icons related to the latest operations includes:

acquiring a task list of a system;

determining a corresponding operation order according to execution time of tasks in the task list, to determine M latest operations; and generating the M password icons related to the latest operations according to the M latest operations.

The present invention also provides a virtual reality device, including a memory, a processor, and a computer program stored on the memory and operable on the processor. The processor executes the computer program to implement the method as mentioned above.

DESCRIPTION OF EMBODIMENTS

For the purpose of making objectives, technical schemes and advantages of the present application more clear, clear and complete description will be made to the technical schemes of the present application in conjunction with specific embodiments and corresponding drawings. Obviously, the described embodiments are merely a part of the embodiments of the present application and not all the embodiments. Based on the embodiments of the present application, all other embodiments obtained by those ordinarily skilled in the art without paying creative work fall within the protection scope of the present application.

In the process of implementing the present invention, the inventor has found that in an existing lock screen application of the virtual reality device, a digital password unlocking mode is mainly adopted, a fixed password is set by the system operation, and each time unlocking is performed, the correct fixed password is input for unlocking. However, the digital password is too single and easy to crack, and the password security is low.

In order to overcome the defects in the prior art, the present invention provides an unlocking method and a virtual reality device. The core of the present invention is that a password icon related to latest operations is set, so that the password icon is updated in real time with the use of a virtual reality device, a password is not easily cracked, and the security is higher. The implementation modes of the present application will be described in detail below with reference to the accompanying drawings and embodiments, and the implementation process of taking the technical means in the present invention to solve the technical problems and achieve the technical effects can be fully understood and implemented.

Figure 1:
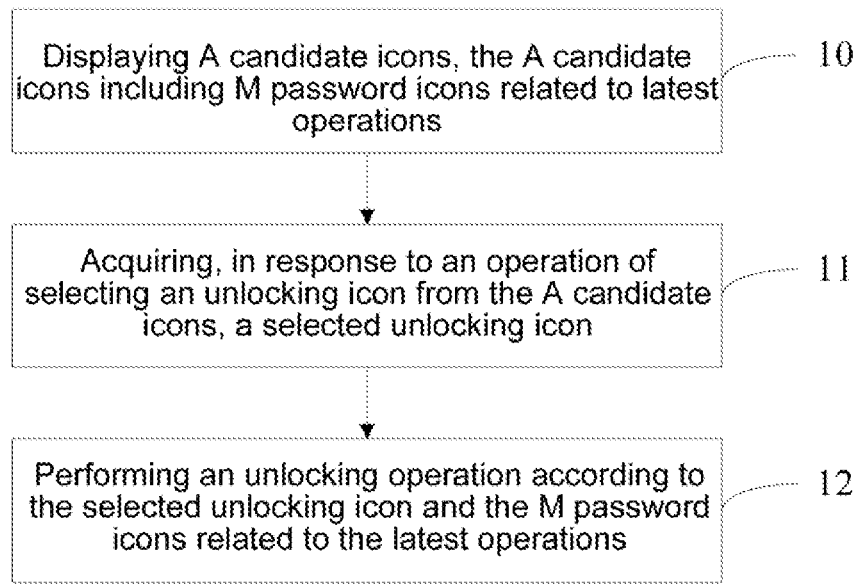
FIG. 1 is a flow schematic diagram of an unlocking method provided by an embodiment of the present invention.

FIG. 1 is a flow schematic diagram of an unlocking method provided by an embodiment of the present invention. In connection of FIG. 1, the method includes:

Step 10: Displaying A candidate icons, the A candidate icons including M password icons related to latest operations;

Step 11: Acquiring, in response to an operation of selecting an unlocking icon from the A candidate icons, a selected unlocking icon; and Step 12: Performing an unlocking operation according to the selected unlocking icon and the M password icons related to the latest operations.

The A candidate icons displayed in this embodiment may be, for example, one or a combination of a photo, a picture, or an application icon, and the password icon may be, for example, an application icon installed in a virtual reality device, a photo stored in the virtual reality device, or a picture that has been called or accessed through the virtual reality device.

The value of M in the M password icons related to the latest operations described in this embodiment may be fixed, or may be flexibly set according to the degree of memory after each screen-off or before unlocking. For example, latest operations may be memorized as many as possible before the screen-off to set the value of M as large as possible, to obtain a higher level of security.

The M password icons related to the latest operations in step 10 may be determined according to an operation order performed by the virtual reality device. For example, a task list of a system may be acquired, and a corresponding operation order is determined according to the execution time of tasks in the task list to determine M latest operation, to generate the M password icons related to the latest operations.

The number of the unlocking icons described in step 11 may be a fixed value, or may be flexibly set as needed after each screen-off or before unlocking. Optionally, step 11 may be implemented in the following implementation mode:

Monitoring, for any one candidate icon in the A candidate icons, retention time of a cursor on the candidate icon; and Determining, if the retention time is greater than a preset time threshold, the candidate icon as the selected unlocking icon.

It should be noted that in this embodiment, the cursor may be a focus point of the head and eyes or a control point of a handle, which is not limited in this embodiment of the present invention.

Optionally, in order to avoid the situation that the number of selected unlocking icons is forgotten, the step of prompting whether to obtain a corresponding number of unlocking icons may also be performed in this embodiment. For example, before the corresponding number of unlocking icon is obtained, a prompt "Please continue to select an unlocking icon" may be given. Or, an unlocking icon display area may be set in the scene of the virtual reality device, the unlocking icon display area is divided into a corresponding number of a display position, and it is prompted whether the selection of an unlocking icon is completed by displaying whether the corresponding number of display position is filled. Or, before obtaining the corresponding number of unlocking icon, no prompt is given, and a prompt of stopping the selection operation is given until the corresponding number of unlocking icon is obtained.

In step 12, judging whether verification is passed according to the selected unlocking icon and the M password icons related to the latest operations, if so, the unlocking operation is performed, and if not, the scene of displaying the A candidate icons in step 10 may be returned to re-select an unlocking icon.

In this embodiment, a password icon related to latest operations of a user is set, so that the password icon is updated in real time with the use of a virtual reality device, a password is not easily cracked, and the user does not need to repeatedly and manually set the password. Therefore, in a lock screen application, the unlocking method provided by the embodiment of the present invention is higher in security.

In addition, this embodiment adopts a form of taking an icon as a password, and the user does not need to memorize an irregular digital password, and only needs to intuitively operate the password icon according to own device usage memory, so that unlocking can be achieved, thereby liberating the user's mind and providing the user with a brand new unlocking experience.

In the foregoing embodiment, the unlocking operation is performed according to the selected unlocking icon and the M password icons related to the latest operations. That is, there may be many implementation modes of step 12. Several modes will be listed below, but are not limited thereto.

Figure 2:
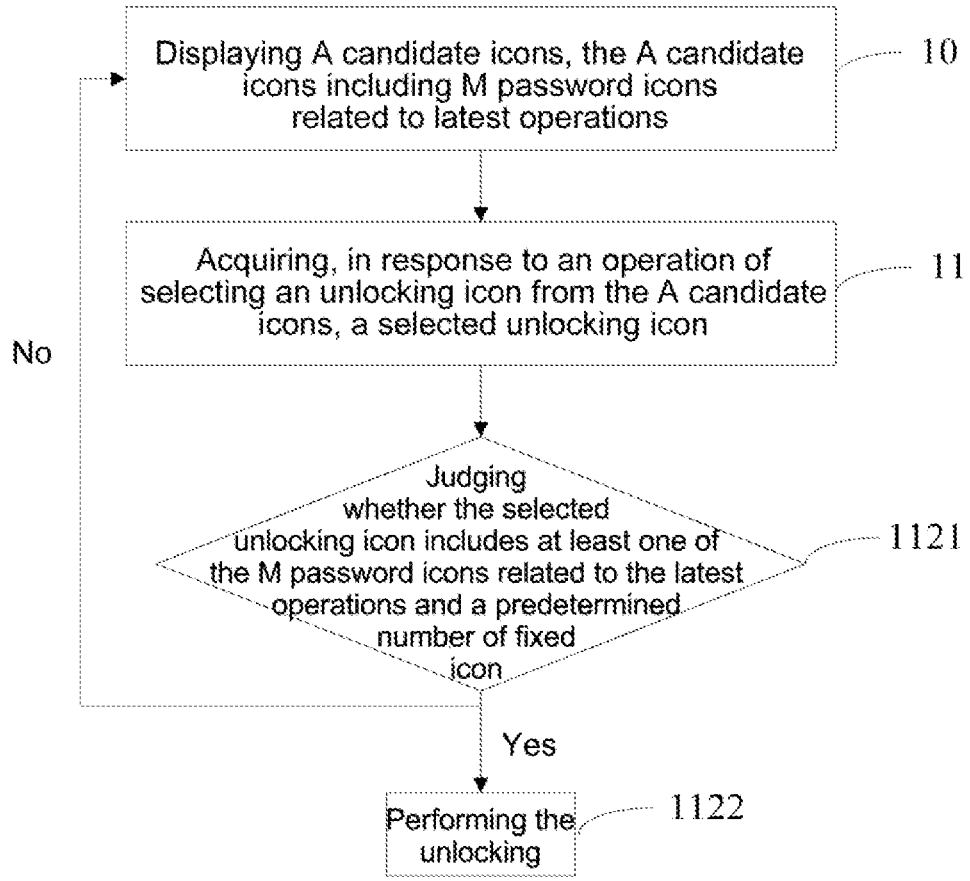
FIG. 2 is a flow schematic diagram of an implementation mode of step 12 as shown in an embodiment of the present invention.

As shown in FIG. 2, an implementation mode of step 12 includes the steps as follows:

Step 1121: Judging whether the selected unlocking icon includes at least one of the M password icons related to the latest operations and a predetermined number of fixed icon; and Step 1122: If a judgment result is yes, performing the unlocking operation.

In the implementation mode shown in FIG. 2, one or more password icon in the M password icons related to the latest operations and the predetermined number of fixed icon are used as unlocking verification conditions, and the number of password icon to be included in the unlocking icon may be determined according to the setting.

For example, it is assumed that the value of M is 5 and the number of fixed icon is 2. If the unlocking icon obtained in step 11 includes 7 icons, 5 icons therein are password icons related to the latest operations, and 2 icons are preset fixed icons, so the verification is passed, and the unlocking operation may be performed.

For another example, it is assumed that the value of M is 5 and the number of fixed icon is 2. If the unlocking icon obtained in step 11 includes 5 icons, 3 icons therein are password icons related to the latest operations, and 2 icons are preset fixed icons, so the verification is passed, and the unlocking operation may be performed.

In this embodiment, the fixed icon is used as a hidden password for the verification of step 12, which effectively avoids a risk that other users except the legal user can unlock the virtual reality device without boundaries according to memory after having used the virtual reality device during the independent verification of the password icon. The fixed icon may be a preset number of fixed icons, e.g., several fixed application icons such as a weather icon and a time icon, or a few pictures that are preferred. Of course, when one or more of the M password icons related to the latest operations coincides with the fixed icon, the coincident icon may be displayed as two to avoid the conflict of the fixed icon with the password icon.

In an alternative embodiment, the step of judging whether the selected unlocking icon includes at least one of the M password icons related to the latest operations and the predetermined number of fixed icon includes:

Acquiring a password icon related to the last operation from the M password icons related to the latest operations;

Judging whether the selected unlocking icon includes the password icon related to the last operation and the predetermined number of fixed icon; and if so, performing the unlocking operation, and if not, returning to the scene of displaying the A candidate icons in step 10 to re-select an unlocking icon.

In the embodiment of the present invention, according to the order of latest operations, a password icon related to the last operation is determined. When the selected unlocking icon includes the password icon related to the last operation and the predetermined number of fixed icon, the verification is passed, and the unlocking operation is performed.

According to the above example, it is assumed that the value of M is 5, the number of fixed icons is 2 and a video application is the last used application, if the unlocking icon obtained in step 11 includes 3 icons, wherein 1 icon is the video application icon, and 2 icons are preset fixed icons. The predetermined number of the fixed icons is 2, and the video application is the last used application, so verification is passed, and the unlocking operation is performed.

The unlocking is verified by the password icon related to the last operation and the predetermined number of fixed icon, which well avoids the difficulty of unlocking due to the inability to remember multiple latest operations.

In an alternative embodiment, on the basis of the unlocking mode as shown in FIG. 2, before step 10, the method may further include:

In the first step, at least one unlocking mode is displayed, the at least one unlocking mode including a combination unlocking mode of the password icon and the fixed icon;

In the second step, in response to an operation of selecting an unlocking mode from the at least one unlocking mode, the selected first unlocking mode is acquired;

In the third step, if the first unlocking mode is the combination unlocking mode of the password icon and the fixed icon, the M password icons related to the latest operations, the predetermined number of fixed icon and other icons are generated; and In the fourth step, the M password icons related to the latest operations, the predetermined number of fixed icon and other icons are randomly arranged, to form the A candidate icons.

It should be noted that the method of generating the A candidate icons in this alternative embodiment may be applied to each foregoing embodiment related to the unlocking mode shown in FIG. 2, which is not elaborated herein.

The method of generating the A candidate icons in the embodiment of the present invention may be performed during screen-off or before unlocking. When the first unlocking mode selected by the user is the combination unlocking mode of the password icon and the fixed icon, M password icons are generated according to the order of the latest operations, a predetermined number of fixed icon is generated, and other icons are randomly generated, to form the A candidate icons.

Figure 3:
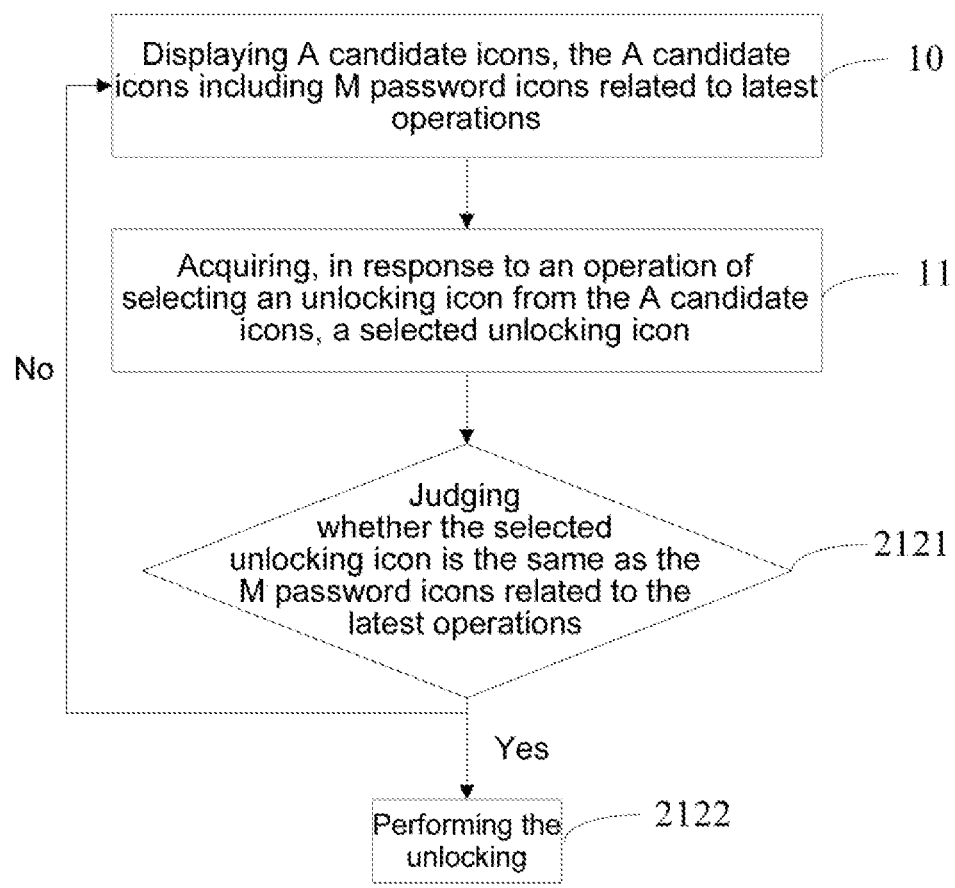
FIG. 3 is a flow schematic diagram of another implementation mode of step 12 as shown in an embodiment of the present invention.

As shown in FIG. 3, another implementation mode of step 12 includes the steps as follows:

Step 2121: Judging whether the selected unlocking icon is the same as the M password icons related to the latest operations; and Step 2122: If a judgment result is yes, the unlocking operation is performed.

In this embodiment, the M password icons related to the latest operations are used as the unlocking verification condition. If the selected unlocking icon acquired in step 11 is in one-to-one correspondence with the M password icons related to the latest operations, the verification is passed, and the unlocking operation is performed. If the selected unlocking icon acquired in step 11 does not have a one-to-one correspondence with the M password icons related to the latest operations, the verification is not passed, and the scene of displaying the A candidate icons in step 10 may be returned.

In this embodiment, unlocking can be implemented only when the unlocking icon and the password icon are identical, thereby improving the password security.

In an alternative embodiment, on the basis of the unlocking mode as shown in FIG. 3, before step 10, the method further includes:

In the first step, at least one unlocking mode is displayed, the at least one unlocking mode including a password icon unlocking mode;

In the second step, in response to an operation of selecting an unlocking mode from the at least one unlocking mode, the selected second unlocking mode is acquired;

In the third step, if the second unlocking mode is the password icon unlocking mode, the M password icons related to the latest operations and other icons are generated; and In the fourth step, the M password icons related to the latest operations and other icons are randomly arranged, to form A candidate icons.

The method of generating the A candidate icons in this embodiment may be performed during screen-off or before unlocking. When the selected second unlocking mode is the password icon unlocking mode, M password icons are generated according to the order of the latest operations, and other icons are randomly generated, to form the A candidate icons.

For each embodiment described above, optionally, before the unlocking operation is performed, the method further includes:

It is judged whether the order of selecting the unlocking icon matches the order of the latest operations, and if so, the unlocking operation is performed.

The order of selecting, by the user, the unlocking icon may be recorded according to step 11, and the order of the latest operations of the user may be acquired according to the task list of the system. In each foregoing embodiment, before the unlocking operation is performed, it is further judged whether the order of selecting, by the user, the unlocking icon matches the order of the latest operations of the user, and the password complexity and security may be further improved. Of course, the step of judgment in the embodiment of the present invention may also be performed before the step of verification of various implementation modes of step 12 described above, which is not limited thereto.

The following is a detailed description of the technical scheme by taking the combination unlocking mode of the password icon and the fixed icon as an example.

When a user wakes up a virtual reality device, a password icon unlocking mode and a combination unlocking mode of the password icon and the fixed icon are displayed in a scene created by the virtual reality device. When the user selects the combination unlocking mode of the password icon and the fixed icon, the user is further prompted to set the number of password icon to be included in the unlocking icon; the number of password icon to be included in the unlocking icon set by the user is 2; after that, according to the presetting of the user, 3 application icons corresponding to a sniper game application, a home decoration application and a road rash game application lately operated by the user are taken as 3 password icons, application icons corresponding to a weather application and a clock application are taken as 2 fixed icons, and 4 other icons are randomly generated, thus forming 9 candidate icons. The 9 candidate icons are displayed in the scene of the virtual reality device for user selection.

After it is monitored that the user selects 5 icons by controlling a cursor through eyeball rotation, the user is prompted that the selection is completed. The 5 unlocking icons selected by the user are the sniper game application icon, the home decoration application icon, the weather application icon, the clock application icon, and the calendar application icon. The number of password icons to be included in the unlocking icon set by the user is 2, so that the unlocking icon selected by the user accords with the verification condition, the verification is passed, and the unlocking operation is performed.

In another unlocking process, the 5 unlocking icons selected by the user are the sniper game application icon, the road rash game application icon, the home decoration application icon, the clock application icon, and the calendar application icon. The user does not correctly select the 2 fixed icons, so that the verification is not passed, the scene of displaying the 9 candidate icons is returned.

In another unlocking process, if the user performs the unlocking operation three times and still does not unlock correctly, the user is prohibited from unlocking. For example, after 10 minutes, 9 candidate icons may be displayed again in the scene of the virtual reality device for the user to perform the unlocking operation.

The present invention also provides a virtual reality device, including a memory, a processor, and a computer program stored on the memory and operable on the processor. The processor executes the computer program to implement the method as mentioned above.

The virtual reality device provided by the embodiment of the present invention may be an external head-mounted display device or an integrated head-mounted display device, where the external head-mounted display device needs to be used in conjunction with an external processing system (such as a computer processing system).

Figure 4:
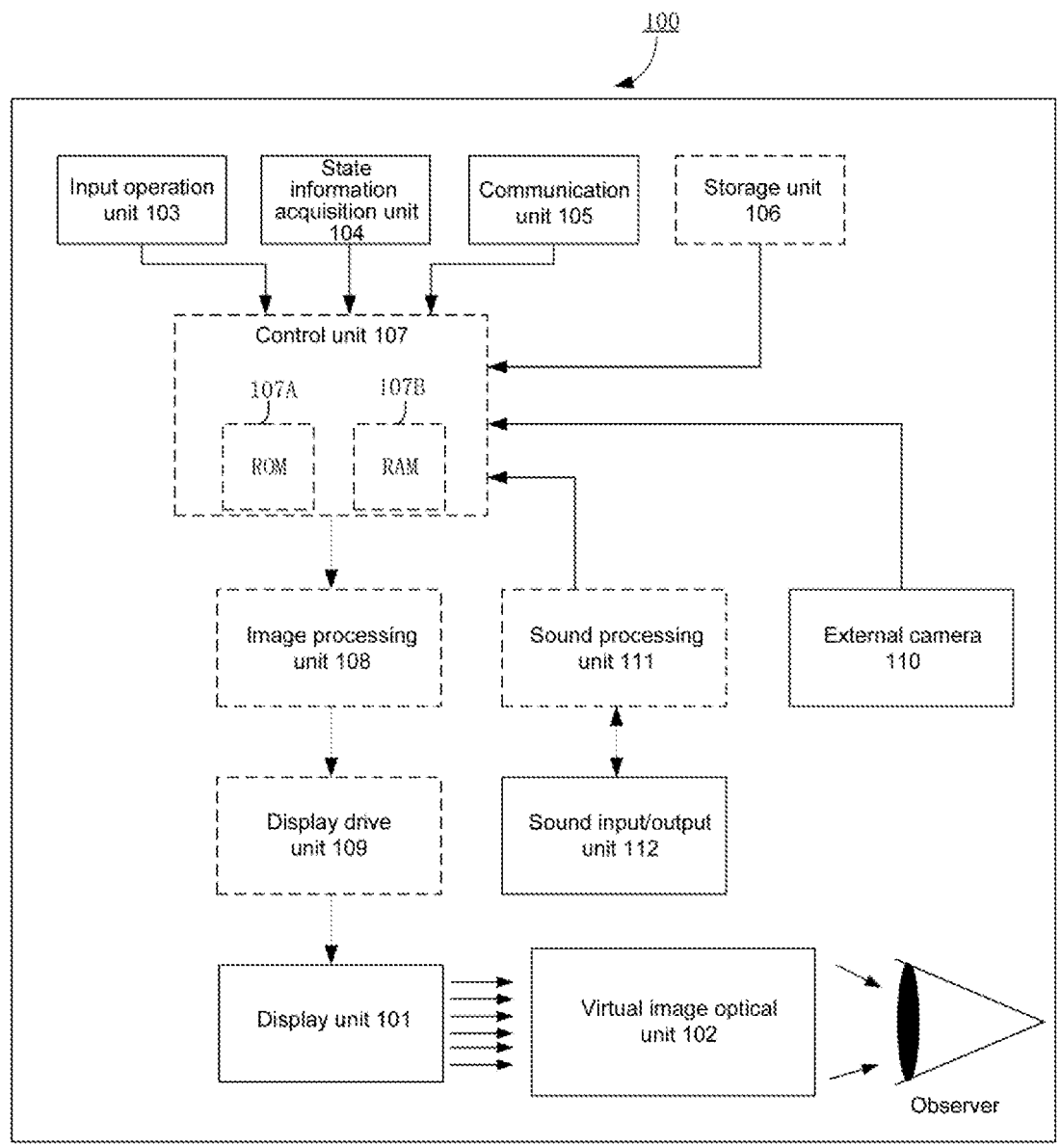
FIG. 4 is a structure schematic diagram of an internal configuration of a virtual reality device 100 provided by an embodiment of the present invention.

FIG. 4 illustrates a structure schematic diagram of internal configuration of a virtual reality device 100 in some embodiments.

A display unit 101 may include a display panel. The display panel is disposed on a side surface of the head-mounted display device 100 facing the face of a user, and may be a one-piece panel or left and right panels respectively corresponding to the left and right eyes of the user. The display panel may be an electroluminescence (EL) element, a liquid crystal display or a miniature display having a similar structure, or a similar laser-scanned display in which the retina may be directly displayed.

A virtual image optical unit 102 photographs an image displayed by the display unit 101 in an enlarged manner, and allows the user to observe the displayed image as an enlarged virtual image. The display image output to the display unit 101 may be an image of a virtual scene provided from a content reproduction device (a Blu-ray disc or a DVD player) or a streaming server, or an image of a real scene photographed by using an external camera 110. In some embodiments, the virtual image optical unit 102 may include a lens unit such as a spherical lens, a non-spherical lens, and a Fresnel lens or the like.

An input operation unit 103 includes at least one operation component for performing an input operation, such as a key, a button, a switch, or other components having similar function, a user instruction is received and is output to a control unit 107 by the operation component.

A state information acquisition unit 104 is configured to acquire state information of the user wearing the head-mounted display device 100. The state information acquisition unit 104 may include various types of sensors and is configured to detect user state information independently, and may acquire state information from an external device (such as a smart phone, a wristwatch, and other multi-functional terminals worn by the user) through a communication unit 105. The state information acquisition unit 104 may acquire head position information and/or pose information of the user. The state information acquisition unit 104 may include one or more of a gyroscope sensor, an acceleration sensor, a global positioning system (GPS) sensor, a geomagnetic sensor, a Doppler effect sensor, an infrared sensor, and a radio frequency field intensity sensor. Further, the state information acquisition unit 104 acquires state information of the user wearing the head-mounted display device 100, and acquires, for example, an operation state of the user (whether the user wears the head-mounted display device 100), an action state of the user (such as standing, walking, running or other similar moving states, the pose of hands or fingertips, the open or closed state of eyes, the direction of a line of sight, and the size of pupils), a mental state (whether the user is immersed in observing the displayed image and the like), or even a physiological state.

The communication unit 105 performs communication processing with an external device, modulation and demodulation processing, and encoding and decoding processing of a communication signal. In addition, the control unit 107 may send transmission data from the communication unit 105 to an external apparatus. The communication mode may be wired or wireless form, such as a mobile high-definition link (MHL) or a universal serial bus (USB), a high-definition multimedia interface (HDMI), wireless fidelity (Wi-Fi), Bluetooth communication or low-power Bluetooth communication, a mesh network of an IEEE802.11s standard, and the like. In addition, the communication unit 105 may be a cellular wireless transceiver that operates according to wideband code division multiple access (W-CDMA), long term evolution (LTE) and similar standards.

In some embodiments, the head-mounted display device 100 may also include a storage unit, the storage unit 106 is configured to be a mass storage device configured to have a solid state drive (SSD) or the like. In some embodiments, the storage unit 106 may store an application program or various types of data. For example, the content viewed by the user using the head-mounted display device 100 may be stored in the storage unit 106.

In some embodiments, the head-mounted display device 100 may also include a control unit, and the control unit 107 may include a computer processing unit (CPU) or other devices having similar function. In some embodiments, the control unit 107 may be configured to execute an application program stored in the storage unit 106, or the control unit 107 may also be configured to be a circuit which is configured to perform a method, a function and an operation disclosed in some embodiments of the present application.

An image processing unit 108 is configured to perform signal processing such as image quality correction related to an image signal output from the control unit 107, and convert the resolution thereof into the resolution of a screen of the display unit 101. Then, a display drive unit 109 sequentially selects each row of pixels of the display unit 101, and sequentially scans each row of pixels of the display unit 101 line by line, thereby providing a pixel signal based on the signal-processed image signal.

In some embodiments, the head-mounted display device 100 may also include an external camera. The external camera 110 may be disposed on a front surface of a main body of the head-mounted display device 100, and there may be one or more external cameras 110. The external camera 110 may acquire three-dimensional information, and may also be used as a distance sensor. In addition, a position sensitive detector (PSD) for detecting a reflected signal from an object or other types of distance sensors may be used with the external camera 110. The external camera 110 and the distance sensor may be configured to detect the body position, posture and shape of the user wearing the head-mounted display device 100. In addition, under certain conditions, the user may directly view or preview a real scene through the external camera 110.

In some embodiments, the head-mounted display device 100 may further include a sound processing unit. The sound processing unit 111 may perform sound quality correction or sound amplification of a sound signal output from the control unit 107, signal processing of an input sound signal, and the like. Then, a sound input/output unit 112 outputs a sound to the outside after sound processing and inputs a sound from a microphone.

In some embodiments, the display unit 101 is configured to display A candidate icons, the A candidate icons including M password icons related to latest operations.

The input operation unit 103 is configured to acquire, in response to an operation of selecting an unlocking icon from the A candidate icons, a selected unlocking icon.

The control unit 107 is configured to perform an unlocking operation according to the selected unlocking icon and the M password icons related to the latest operations.

In some embodiments, the control unit 107 is specifically configured to:

judge whether the selected unlocking icon includes at least one of the M password icons related to the latest operations and a predetermined number of fixed icon; and perform, if a judgment result is yes, the unlocking operation.

In some embodiments, the control unit 107 is specifically configured to:

acquire a password icon related to the last operation from the M password icons related to the latest operations; and judge whether the selected unlocking icon includes the password icon related to the last operation and a predetermined number of fixed icon.

In some embodiments, the control unit 107 is specifically configured to: judge whether an order of selecting the unlocking icon matches an order of the latest operations before performing the unlocking operation, and perform, if so, the unlocking operation.

In some embodiments, the display unit 101 is further configured to display at least one unlocking mode, the at least one unlocking mode including a password icon and fixed icon combined unlocking mode.

The input operation unit 103 is further configured to acquire, in response to an operation of selecting an unlocking mode from the at least one unlocking mode, the selected first unlocking mode.

The control unit 107 is further configured to generate, if the first unlocking mode is the password icon and fixed icon combined unlocking mode, the M password icons related to the latest operations, a predetermined number of fixed icon and other icons; and randomly arrange the M password icons related to the latest operations, a predetermined number of fixed icon and other icons, to form the A candidate icons.

In some embodiments, the control unit 107 is specifically configured to:

judge whether the selected unlocking icon is the same as the M password icons related to the latest operations; and perform, if a judgment result is yes, the unlocking operation.

In some embodiments, the display unit 101 is further configured to display at least one unlocking mode, the at least one unlocking mode including a password icon unlocking mode.

The input operation unit 103 is further configured to acquire, in response to an operation of selecting an unlocking mode from the at least one unlocking mode, the selected second unlocking mode.

The control unit 107 is further configured to generate, if the second unlocking mode is the password icon unlocking mode, the M password icons related to the latest operations and other icons; and randomly arrange the M password icons related to the latest operations and other icons, to form A candidate icons.

In some embodiments, the input operation control unit 103 is specifically configured to:

monitor, for any one candidate icon in the A candidate icons, retention time of a cursor on the candidate icon; and determine, if the retention time is greater than a preset time threshold, the candidate icon as the selected unlocking icon.

In some embodiments, the control unit 107 is specifically configured to:

acquire a task list of a system;

determine a corresponding operation order according to execution time of tasks in the task list, to determine M latest operations; and generate the M password icons related to the latest operations according to the M latest operations.

It should be noted that the structure or component shown by a dashed box in FIG. 4 may be independent of the head-mounted display device 100, for example, may be disposed in an external processing system (such as a computer system) for use with the head-mounted display device 100; or, the structure or component shown by a dashed box may be disposed inside or on the surface of the head-mounted display device 100.

Here, it should be noted that the feature parameter determination apparatus provided by the foregoing embodiments may implement the technical solutions described in each foregoing method embodiment. The specific implementation principle of the foregoing modules or units may refer to the corresponding content in the foregoing method embodiments, and will not be elaborated herein.

The apparatus embodiments described above are merely illustrative, where the units described as separate components may or may not be physically separated, and the components displayed as units may or may not be physical units, i.e., may be located at a place, or may be distributed to multiple network units. Some or all of the modules may be selected according to actual needs to achieve the purpose of the scheme of this embodiment. Those of ordinary skill in the art can understand and implement without creative work.

Through the description of the above implementation modes, those skilled in the art can clearly understand that various implementation modes may be implemented by means of software and a necessary general hardware platform, and of course, by hardware. Based on such understanding, the essence of the foregoing technical solutions or portions making contribution to the prior art may be embodied in the form of software products. The computer software products may be stored in a computer-readable storage medium such as a ROM/RAM, a magnetic disk and an optical disc, including instructions for causing a computer device (which may be a personal computer, a server, or a network device, etc.) to perform the methods described in various embodiments or portions of the embodiments.

Finally, it should be noted that the above embodiments are only used to illustrate the technical solutions of the present invention, and are not limited thereto. Although the present invention has been described in detail with reference to the foregoing embodiments, those of ordinary skill in the art will understand that the technical solutions described in the foregoing embodiments can be still modified, or some technical features are equivalently replaced. These modifications or replacements do not make the essence of the corresponding technical solutions depart from the spirit and scope of the technical solutions in various embodiments of the present invention.

The invention claimed is:

1. An unlocking method, applied to a virtual reality device, comprising:

displaying A candidate icons, by the virtual reality device, the A candidate icons comprising M password icons related to latest operations; wherein the A candidate icons are displayed in a scene created by the virtual reality device, and the M password icons related to the latest operations are determined according to an operation order;

acquiring, by the virtual reality device, in response to an operation of selecting an unlocking icon from the A candidate icons, a selected unlocking icon; and performing, by the virtual reality device, an unlocking operation of the virtual reality device according to the selected unlocking icon, the M password icons related to the latest operations and an order of the selecting the unlocking icon matching an operation order of the selected unlocking icon;

wherein A and M are integers, and A is larger than M, and wherein a method of generating the M password icons related to the latest operations comprises:

acquiring, by the virtual reality device, a task list of a system;

determining, by the virtual reality device, a corresponding operation order according to execution time of tasks in the task list, to determine M latest operations; and generating, by the virtual reality device, the M password icons related to the latest operations according to the M latest operations;

wherein the M password icons related to the latest operations have a one-to-one correspondence with icons of the M latest operations.

2. The unlocking method according to claim 1, wherein, the performing, by the virtual reality device, the unlocking operation according to the selected unlocking icon and the M password icons related to the latest operations comprises:

judging, by the virtual reality device, whether the selected unlocking icon comprises at least one of the M password icons related to the latest operations and a predetermined number of fixed icon; and if a judgment result is yes, performing the unlocking operation.

3. The unlocking method according to claim 2, wherein, the judging, by the virtual reality device, whether the selected unlocking icon comprises at least one of the M password icons related to the latest operations and the predetermined number of fixed icon comprises:

acquiring, by the virtual reality device, a password icon related to the last operation from the M password icons related to the latest operations; and judging, by the virtual reality device, whether the selected unlocking icon comprises the password icon related to the last operation and a predetermined number of fixed icon.

4. The unlocking method according to claim 2, wherein, before the performing the unlocking operation, the method further comprises:

judging, by the virtual reality device, whether an order of selecting the unlocking icon matches an order of the latest operations, and if so, performing the unlocking operation.

5. The unlocking method according to claim 2, wherein, before the displaying, by the virtual reality device, A candidate icons, the method further comprises:

displaying, by the virtual reality device, at least one unlocking mode, the at least one unlocking mode comprising a combination unlocking mode of the password icon and the fixed icon;

acquiring, by the virtual reality device, in response to the operation of selecting the unlocking mode from the at least one unlocking mode, the selected first unlocking mode;

if the first unlocking mode is the combination unlocking mode of the password icon and the fixed icon, generating, by the virtual reality device, the M password icons related to the latest operations, a predetermined number of fixed icon and other icons; and randomly arranging, by the virtual reality device, the M password icons related to the latest operations, a predetermined number of fixed icon and other icons, to form the A candidate icons.

6. The unlocking method according to claim 1, wherein, the performing, by the virtual reality device, the unlocking operation according to the selected unlocking icon and the M password icons related to the latest operations comprises:

judging, by the virtual reality device, whether the selected unlocking icon is the same as the M password icons related to the latest operations; and if a judgment result is yes, performing the unlocking operation.

7. The unlocking method according to claim 6, wherein, before the displaying, by the virtual reality device, A candidate icons, the method further comprises:

displaying, by the virtual reality device, at least one unlocking mode, the at least one unlocking mode comprising a password icon unlocking mode;

acquiring, by the virtual reality device, in response to the operation of selecting the unlocking mode from the at least one unlocking mode, the selected second unlocking mode;

if the second unlocking mode is the password icon unlocking mode, generating, by the virtual reality device, the M password icons related to the latest operations and other icons; and randomly arranging, by the virtual reality device, the M password icons related to the latest operations and other icons, to form A candidate icons.

8. The unlocking method according to claim 1, wherein, the acquiring, by the virtual reality device, in response to the operation of selecting the unlocking icon from the A candidate icons, the selected unlocking icon comprises:

monitoring, by the virtual reality device, for any one candidate icon in the A candidate icons, retention time of a cursor on the candidate icon; and if the retention time is greater than a preset time threshold, determining, by the virtual reality device, the candidate icon as the selected unlocking icon.

9. A virtual reality device, comprising a memory, a processor, and a computer program stored on the memory and operable on the processor, wherein, the processor executes the computer program to implement the method of claim 1.

10. A virtual reality device, comprising a memory, a processor, and a computer program stored on the memory and operable on the processor, wherein, the processor executes the computer program to implement the method of claim 2.

11. A virtual reality device, comprising a memory, a processor, and a computer program stored on the memory and operable on the processor, wherein, the processor executes the computer program to implement the method of claim 3.

12. A virtual reality device, comprising a memory, a processor, and a computer program stored on the memory and operable on the processor, wherein, the processor executes the computer program to implement the method of claim 4.

13. A virtual reality device, comprising a memory, a processor, and a computer program stored on the memory and operable on the processor, wherein, the processor executes the computer program to implement the method of claim 5.

14. A virtual reality device, comprising a memory, a processor, and a computer program stored on the memory and operable on the processor, wherein, the processor executes the computer program to implement the method of claim 6.

15. A virtual reality device, comprising a memory, a processor, and a computer program stored on the memory and operable on the processor, wherein, the processor executes the computer program to implement the method of claim 7.

16. The unlocking method according to claim 1, wherein, the M password icons related to latest operations are consisted of application icons, and applications corresponding to the application icons are installed in a virtual reality device and operations of the applications are listed in a task list of a system of the virtual reality device before each time of a screen-off.

17. The virtual reality device according to claim 9, wherein, the M password icons related to latest operations are consisted of application icons, and applications corresponding to the application icons are installed in a virtual reality device and operations of the applications are listed in a task list of a system of the virtual reality device before each time of a screen-off.

18. The unlocking method according to claim 1, wherein, the selected unlocking icon is acquired based on a head and/or eye movement of a user of the virtual reality device.

19. The unlocking method according to claim 1, wherein, the acquiring, by the virtual reality device, in response to the operation of selecting the unlocking icon from the A candidate icons, the selected unlocking icon comprises:

monitoring, by the virtual reality device, for any one candidate icon in the A candidate icons, retention time of a cursor on the candidate icon;

wherein, the cursor is focus point of a head and eyes or a control point of a handle.

\* \* \* \* \*